United States Patent [19]
Zimmerer et al.

[11] 3,994,514
[45] *Nov. 30, 1976

[54] FLEXIBLE JOINT FOR AN OVERHEAD IRRIGATION SYSTEM

[75] Inventors: Arthur L. Zimmerer; Bernard J. Zimmerer; Paul B. Zimmerer, all of Lindsay, Nebr.

[73] Assignee: Lindsay Manufacturing Company, Lindsay, Nebr.

[ * ] Notice: The portion of the term of this patent subsequent to June 12, 1990, has been disclaimed.

[22] Filed: July 1, 1974

[21] Appl. No.: 484,442

Related U.S. Application Data

[63] Continuation of Ser. No. 205,239, Dec. 6, 1971, abandoned, which is a continuation-in-part of Ser. No. 92,089, Nov. 23, 1970, Pat. No. 3,738,687.

[52] U.S. Cl. .................................. 285/5; 285/93; 285/373
[51] Int. Cl.² .......................................... F16L 55/00
[58] Field of Search ............... 285/5, 265, 373, 118, 285/110, 111, 93; 239/212, 213, 177; 137/344

[56] References Cited
UNITED STATES PATENTS

| | | | |
|---|---|---|---|
| 2,494,854 | 11/1950 | Anderson | 285/5 |
| 2,874,979 | 2/1959 | Shohan | 285/112 X |
| 2,889,993 | 6/1959 | Willetts | 239/111 |
| 3,003,793 | 10/1961 | Pitt | 285/373 X |
| 3,057,559 | 10/1962 | Ingram et al. | 239/213 |
| 3,394,729 | 7/1968 | Bower et al. | 137/344 |
| 3,533,557 | 10/1970 | Ingram et al. | 137/344 X |
| 3,663,044 | 5/1972 | Contreras et al. | 285/265 X |
| 3,667,782 | 6/1972 | Viazzi | 285/110 |
| 3,738,687 | 6/1973 | Zimmerer et al. | 285/5 |

*Primary Examiner*—Andrew V. Kundrat
*Attorney, Agent, or Firm*—Kinzer, Plyer, Dorn & McEachran

[57] ABSTRACT

The adjacent extremities of two lengths of irrigation pipe are axially aligned in a spaced relationship within a longitudinally split, bolt closed coupler sleeve. The coupler sleeve has a diameter greater than that of the pipes and contains a one-piece sealing boot therein which sealably embraces the ends of the irrigation pipe. An open gimbal ring medially surrounds the coupler sleeve in a diametrically spaced relationship with respect thereto. Bracket members are mounted on the opposite sides of each pipe extremity in a longitudinally spaced relationship with respect to the coupler sleeve and a pair of arms extend from each bracket member to opposite pivotal connections with the gimbal ring, the axes of the pivotal connections of one pair being circumferentially spaced on said gimbal ring at 90° from the pivotal connections of the other pair to enable the pipe lengths to freely, relatively and arcuately swing in any desired direction. A signal device is trained between the extremities of the pipe lengths to give a signal relative to the arc of swing between the extremities.

14 Claims, 7 Drawing Figures

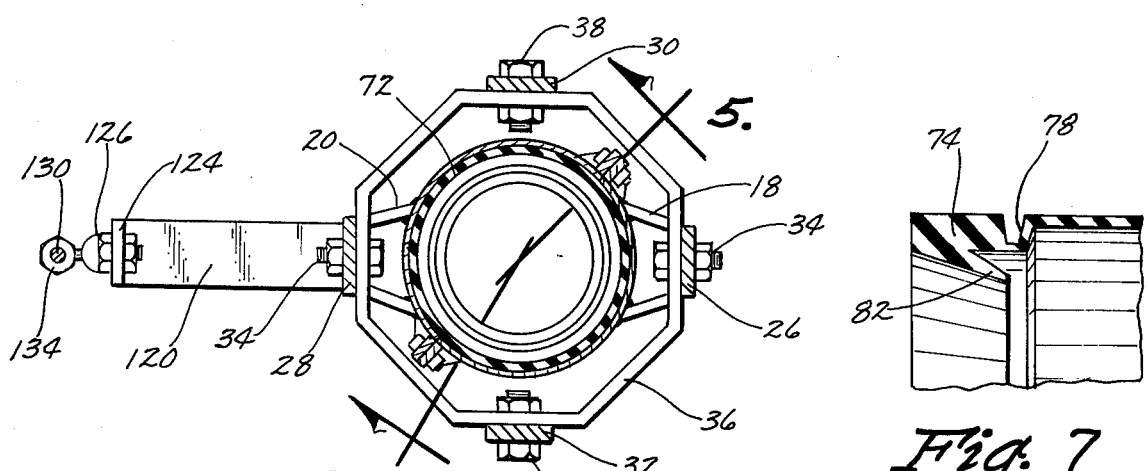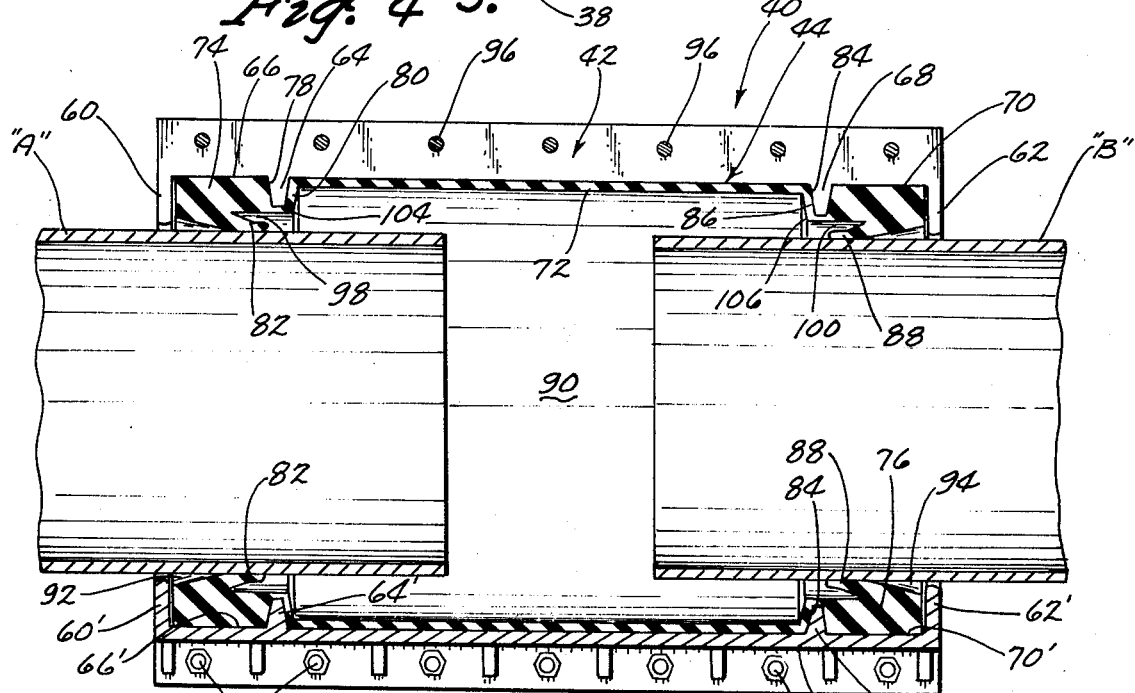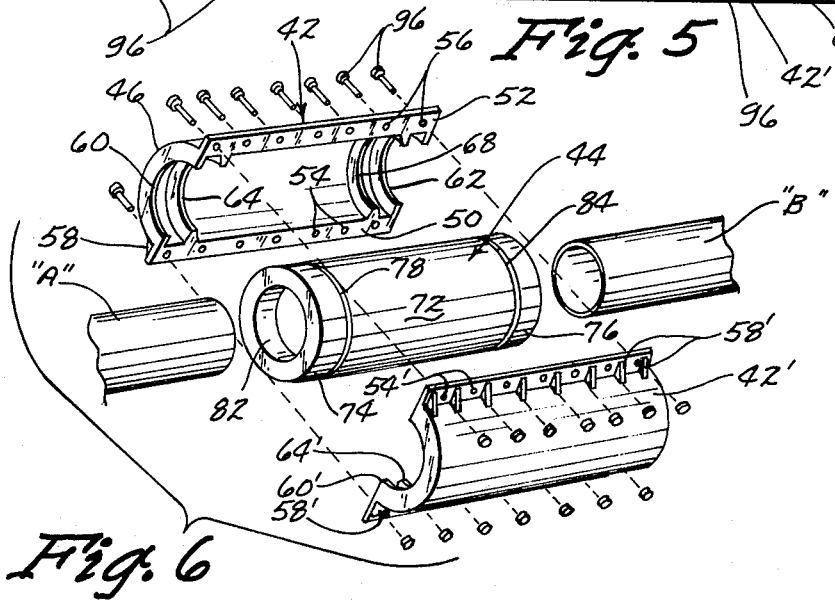

FLEXIBLE JOINT FOR AN OVERHEAD IRRIGATION SYSTEM

This is a continuation of application Ser. No. 205,239, filed Dec. 6, 1971, now abandoned, which is a continuation-in-part application of the application, Ser. No. 92,089 filed Nov. 23, 1970, now U.S. Pat. No. 3,738,687.

While not limited to, this invention is especially useful in an overhead irrigation system of the type having a line of sprinkler-carrying pipe lengths supported above the ground upon spaced, portable, self-propelled, individually motor driven, supporting towers, the pipe-line being pivotally mounted at one extremity so that the towers travel in circles around the pivoted extremity to irrigate a relatively large circular area such as shown in prior U.S. Pat. Nos. 3,335,958 and 3,394,729.

Since the large area being irrigated is rarely flat, the towers will be constantly travelling over a plurality of differing grades. Often one tower will be at a higher altitude than the adjacent towers at each side, therefore the plurality of pipe lengths must be joined by universally-flexible joints to prevent damage to the pipe-line.

Attempts have been made to join such lengths with flexible hydraulic couplings, such as sections of flexible hose or corrugated sleeves such as shown in prior U.S. Pat. Nos. 2,889,993 and 3,053,554, but these attempts have not been satisfactory since the constant flexing quickly destroys the connection and frequent and expensive replacements are often necessary. Other attempts have been made to provide the adjoining extremities with large ball and socket elements, such as shown in prior U.S. Pat. Nos. 1,617,587 and 2,628,863, but these have been too heavy and too costly to be practical and were subject to damage occasioned by the constant relative axial and angular movements of the connected lengths.

Many of the prior devices for this purpose allow the lengths to axially rotate relative to each other while results in constant damage, such as twisting and breaking the hoses, couplings and connecting links, and also makes it difficult to install safety signals at the joints.

This invention relates specifically to a flexible joint structure for overhead irrigation pipes and has for its principal object the provision of a flexible joint which will overcome the above difficulties and which: will be economical to manufacture and highly efficient in use; will allow replacements to be quickly and easily made without disturbing the pipe-line or its supporting towers; which will freely and accurately maintain the required universal angular movements of the pipe-line without strain or leakage; and which will absolutely prevent relative axial rotation between the adjacent pipe lengths in the pipe line.

The split coupler sleeve of the U.S. Pat. No. 3,738,687, while being generally satisfactory, presented some sealing and maintenance problems. The split coupler sleeve disclosed herein represents a distinct improvement over the split coupler sleeve and gasket arrangement of U.S. Pat. No. 3,738,687.

The principal object of the invention is to provide flexible joints of the above type with means for supporting and actuating electrical switching devices, which will automatically control the operation of the drive towers on the supporting towers, in consequence of relative angular movements in a horizontal plane between adjacent pipe lengths in the pipe line.

A still further object of this invention is to provide an improved coupler sleeve and sealing boot which positively prevents leakage from the joint connection of the two pipe lengths.

A further object of this invention is to provide a split coupler sleeve and sealing boot which may be repaired or replaced without dismantling the irrigation structure.

A further object of this invention is to provide a coupling sleeve and sealing boot which provides the required flexibility for the adjacent pipe lengths.

A further object of this invention is to provide a coupler sleeve and sealing boot which may be easily and quickly repaired and/or replaced.

A further object of this invention is to provide a coupler sleeve and sealing boot which is dependable.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 4 is a sectional view as would be seen along lines 4—4 of FIG. 3;

FIG. 5 is an enlarged sectional view as would be seen along lines 5—5 of FIG. 4;

FIG. 6 is an exploded perspective view of the split coupler; and

FIG. 7 is a partial sectional view of one end of the sealing boot.

Figure 1:
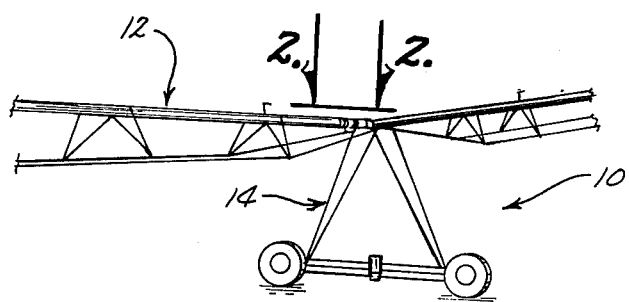
FIG. 1 is a partial perspective view of a center pivot irrigation system employing the instant invention.

The numeral 10 generally designates a conventional center pivot irrigation system which is partially shown in FIG. 1 comprising an overhead irrigation pipe 12 which is supported by a plurality of towers 14 which propel the system around its center pivot. The pipe 12 is comprised of a plurality of individual pipes secured together in conventional fashion. However, at each of the support towers 14, a flexible joint is provided to permit the pipes A and B to be flexibly joined. It should be noted that it is not necessary to provide the flexible joint at the outermost support tower. The numeral 16 generally designates the flexible joint of this invention. Two elongated bracket members 18 and 20 of V-shaped cross section are welded or otherwise secured to the pipe A adjacent and upon opposite sides of, its joining extremity and two similar bracket members 22 and 24 are similarly positioned and secured to the pipe B adjacent its joining extremity. A first pair of elongated pivot arms 26 and 28 are welded or otherwise respectively secured upon the bracket members 18 and 20 and extend longitudinally beyond the joining extremity of the pipe A. A second pair of similar elongated pivot arms 30 and 32 are similarly and respectively secured to the bracket members 22 and 24 and extend longitudinally beyond the extremity of the pipe B intermediate the first pair of arms 26 and 28.

The extremities of the first pair of arms 26 and 28 are pivoted (at 180° spacing) by means of pivot bolts 34 to opposite vertical, flat sides of an open, octagonal gimbal ring 36 which surrounds the adjacent extremities of the pipes in radially-spaced relation therewith. The extremities of the second pair of arms 30 and 32 are similarly pivoted to intermediate horizontal flat sides of the gimbal ring 36 by means of pivot bolts 38, spaced at 90° from the pivot bolts 34.

The pivot bolts 34 and 38 lie in a common plane and the latter plane intersects the intersection of the center lines of the pipes A and B within the gimbal ring 36. In actual practice, the length of the arms 26, 28, 30 and 32 is such so as to maintain the pipe extremities spaced from each other, as illustrated in FIG. 5. This provides a universal angular connection between the two pipes and prevents relative axial rotation therebetween. The structure having been described thus far is identical to the structure in U.S. Pat. No. 3,738,687.

The numeral 40 generally refers to the improved coupler assembly of this invention comprising generally a split coupler 42 and a sealing boot 44. Coupler 42 is comprised of two semi-cylindrical halves or members 46 and 46'. Coupler member 46 includes a pair of radially extending edge flanges 50 and 52 having a plurality of openings 54 and 56 formed therein respectively. A plurality of strengthening ribs 58 extend between the edge flanges 50 and 52 and the external surface of the member 46 to provide the necessary strength and rigidly to the flanges. Coupler member 46 is provided with a pair of inwardly extending ridges 60 and 62 at its opposite ends as seen in FIG. 6. A semicircular ridge 64 extends inwardly from the interior of member 46 in a spaced relationship with respect to the ridge 60 to define a pocket 66 therebetween. As seen in FIG. 5, ridge 64 does not extend inwardly as far as does ridge 60. Likewise, a ridge 68 extends inwardly from the interior of member 46 inwardly of the ridge 62 to define a pocket 70 therebetween. Inasmuch as coupler member 46' is identical to coupler member 46, only coupler member 46 will be described in detail with "'" indicating identical structure on coupler member 46'.

Sealing boot 44 generally comprises a cylindrical body portion 72 having end portions 74 and 76 at opposite ends thereof. An annular, V-shaped groove 78 is formed in the exterior surface of boot 44 which is adapted to receive the ridges 64 and 64' when the coupler 42 is clamped around the boot 44. As seen in FIG. 5, end portion 74 is thicker than body portion 72 to define a shoulder 80 therebetween. As also seen in FIG. 5, the groove 78 is formed in boot 44 adjacent the shoulder 80. A resilient, inclined annular flat element 82 extends inwardly from the inner surface of end portion 74. An annular, V-shaped groove 84 is formed in the exterior surface of boot 44 which is adapted to receive the ridges 68 and 68' when the coupler 42 is clamped around the boot 44. As seen in FIG. 5, end portion 76 is thicker than body portion 72 to define a shoulder 86 therebetween. As also seen in FIG. 5, the groove 84 is formed in boot 44 adjacent the shoulder 86. A resilient, inclined annular flat element 88 extends inwardly from the inner surface of end portion 76. For purposes of description, boot 44 will be described as having a central passageway 90 in communication with end openings 92 and 94 which are adapted to receive the pipes A and B as illustrated in FIG. 5.

The coupler members 46 and 46' are clamped together by means of suitable clamp bolts 96 and the clamping together of the coupler members around the boot 44 urges the flaps 82 and 88 into sealing engagement with the pipes A and B as illustrated in FIG. 5. The relationship of the pipes A and B and the flap elements 82 and 88 is such that the external or outside diameter of the pipes is greater than the normal inside diameter of the flap elements so that the flap elements will sealably embrace the exterior surfaces of the pipes. The flap elements are also maintained in sealable engagement with the external surfaces of the pipes due to the water pressure within the boot and within the areas generally designated by the reference numerals 98 and 100 respectively. The water pressure in the areas 98 and 100 urges the flap elements 82 and 88 against the exterior surfaces of the pipes.

It can be seen that as thus far described an efficient flexible pipe joint is provided for any desired use since the spaced pipes can be freely and relatively swung in any desired direction and at any desired angle without intermediate leakage. The joint can be supported in any desired manner. As herein illustrated, the pipe A is supported by the pipe B and suitable brackets 102 are provided on the pipe B for connecting conventional supporting towers 14 thereto.

The coupler assembly 40 may be easily repaired or replaced as desired without disassembling the tower or pipe structure. The clamp bolts 96 may be easily removed in conventional fashion so that the coupler halves or members 46 and 46' may be removed from the boot 44. If the boot 44 is to be removed, one end of the boot is grasped and moved towards the other end of the boot which causes the cylindrical body portion 72 to be "compressed" so that the end portion of the boot may be slidably removed from the respective pipe. When one end of the boot has been removed from one of the pipes, the other end of the boot may then be slidably removed from the other pipe. A new boot 44 is easily installed by simply slipping one end of the boot over the extremity of one of the pipes until the end portion is in the approximate desired location. The other end of the boot 44 is then grasped to move the end of the boot towards the other end of the boot to compress the body portion 72 to permit the end of the boot to be slipped over the extremity of the pipe. The coupler members 46 and 46' are then clamped onto the boot 44 to provide the necessary strength and rigidity to the assembly. The reinforcing or strengthening ribs 58 and 58' add to the strength and rigidity of the assembly. It should be noted that body portion 72 could have the same thickness and the end portions 74 and 76 but the configuration shown in the drawings is the preferred configuration since the boot would tend to break at 104 and 106 if the end portions and the body portion of the boot had the same thickness. In other words, the configuration shown in FIG. 5 provides the end members with somewhat more flexibility and aids in installing the boot on the pipes since the boot in its preferred embodiment or configuration permits the body portion 72 to be more easily compressed during the installation or removal of the boot.

To increase the desirability for overhead sprinkler use, a signal device is incorporated with the above flexible joint should it be desired to automatically control the pipe angularity, the water supply and the pipeline alignment in long overhead pipe systems.

As illustrated, the signal device employs an electrical control box 108, containing desired electrical switching elements, to which current is supplied from the pivoted extremity of the pipe-line through a supply cable 110 and from which current is supplied to the supporting tower motor by means of a motor cable 112. The switching elements are controlled by reciprocation of an external toggle switch lever 114 which is mounted for reciprocation on the control box 108. The elements in the control box 108 are within the skill of one skilled in the art desiring to attain the desired results. For instance, typical box circuits and typical individual tower motors are shown in prior U.S. Pat. No. 3,394,729.

In the present instance, the box 108 is supported from one side of the pipe B upon a horizontally extending bracket arm 116, which for convenience of assembly is formed in two parts joined by means of suitable clamp bolts 118. A horizontal control arm 120, braced by a triangular gusset plate 122, is welded or otherwise secured to the pivot arm 28 of the pipe A so as to project sidewardly therefrom. The outer extremity of the control arm 120 is turned at right angles, as shown at 124, to support a conventional ball-and-socket fitting 126 which rotatably and tiltably supports a rod head 128. The switch lever 114 is actuated by means of a threaded connecting rod 130, connected therewith as shown at 132, and extending through the rod head 128, as shown in FIG. 2, where it can be locked at any desired longitudinal position by means of a pair of lock nuts 134.

Figure 2:
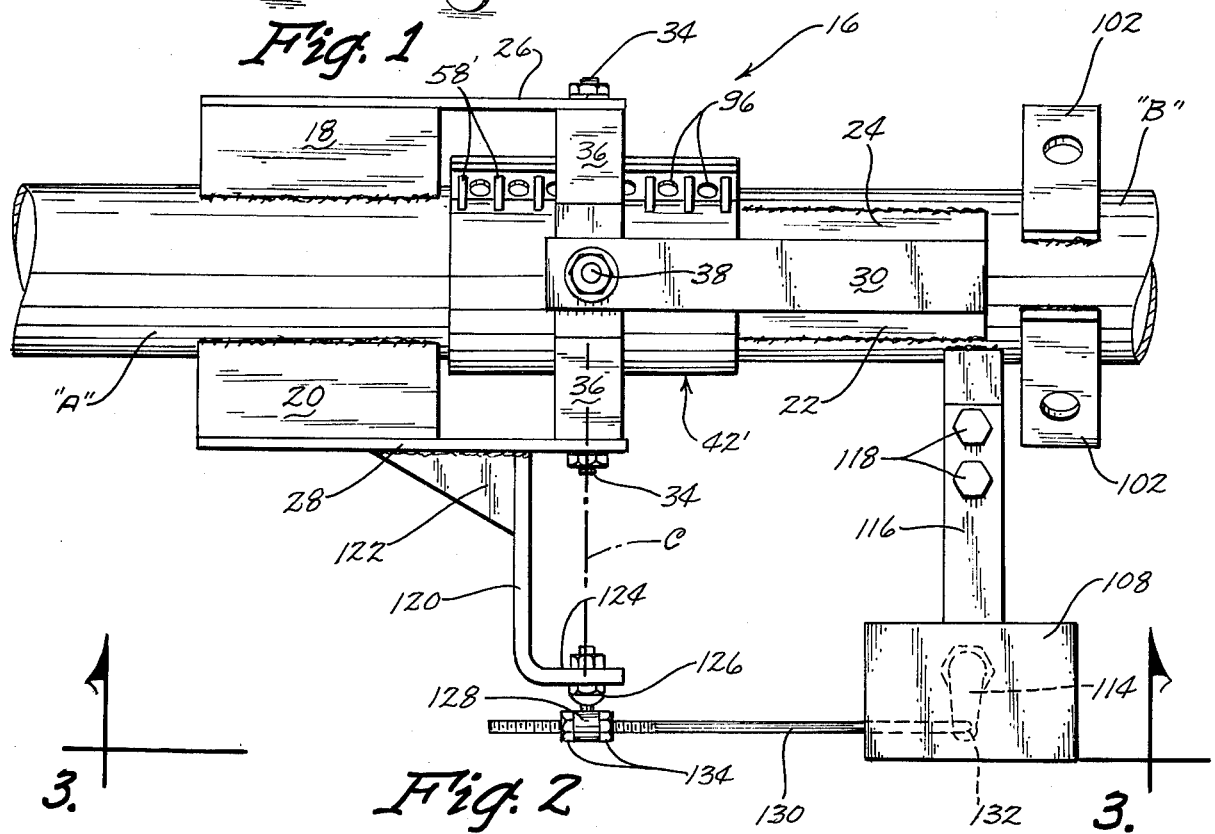
FIG. 2 is a top plan view of the invention as would be seen along lines 2—2 of FIG. 1.
Figure 3:
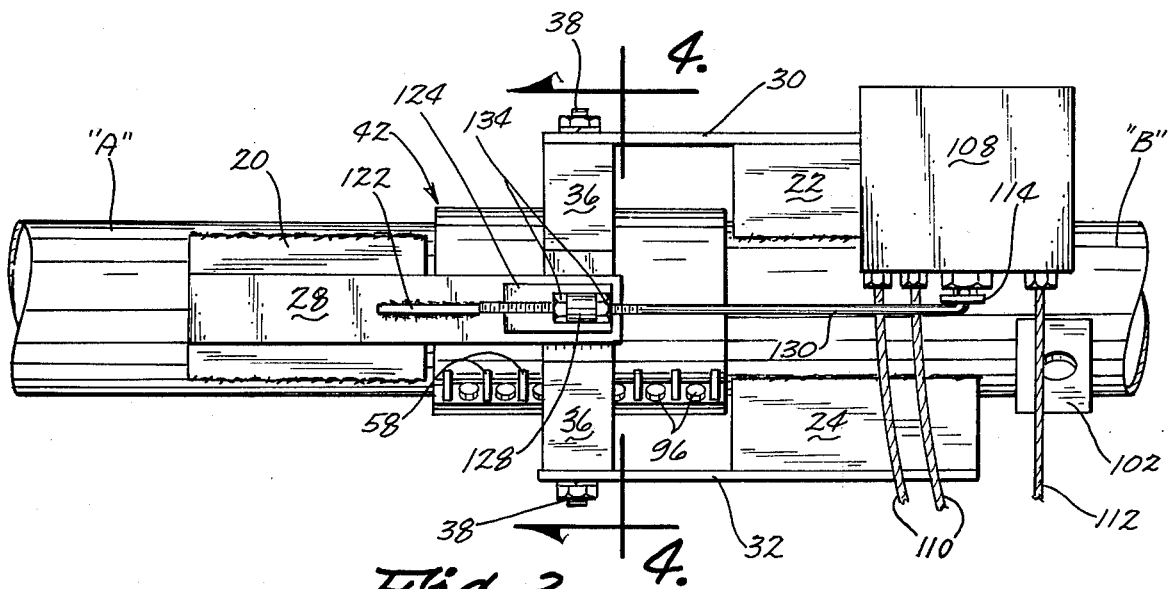
FIG. 3 is a side elevational view as would be seen along lines 3—3 of FIG. 2.

The ball-and-socket fitting 126 is axially aligned with the axes of the pivot bolts 34 of the gimbal ring 36, as indicated by the center line C in FIG. 2, and the connecting rod 130 is axially parallel to the axis of the pipe B so that all relative sidewise, angular movements of the connected lengths will cause the connecting rod 130 to swing the switch lever 114 back and forth on the control box to control the circuits therein in correspondence with the said sidewise angular movements. The lock nuts 134 allow presetting adjustments to be conveniently made along the rod 130 so as to accomplish the desired results.

Thus, in a sprinkling system of the type having motor propelled supporting towers, the motors in the individual towers will be automatically controlled by the horizontal angles assumed at their respective flexible joints so as to automatically maintain the entire pipe-line in substantial alignment. It will be noted that the assumed angles of the pipe will be multiplied by the length of sideward extension of the bracket arm 116 and the control arm 120 so that a multiplied actuation will be obtained at the switch lever 114 to facilitate accurate control.

Thus it can be seen that the invention accomplishes at least all of its stated objectives.

We claim:

1. A pipe joint for flexibly joining an extremity of a first pipe to an extremity of a second pipe positioned in axial alignment with and spaced from the first pipe, comprising a generally cylindrical coupler sleeve means surrounding the adjacent extremities of said first and second pipes, means in said coupler sleeve means for flexibly sealing said extremities to said sleeve means, support means flexibly connecting said first and second pipes, said sleeve means comprising first and second, semicircular, rigid sleeve members, and bolt means securing said sleeve members together, said sleeve members having radially extending edge flanges which are positioned adjacent each other, said bolt means extending through said edge flanges, each of said sleeve members having reinforcing plates extending between the external surface thereof and the edge flanges thereon.

2. A pipe joint for flexibly joining an extremity of a first pipe to an extremity of a second pipe positioned in axial alignment with and spaced from the first pipe, comprising a generally cylindrical coupler sleeve means surrounding the adjacent extremities of said first and second pipes, means in said coupler sleeve means for flexibly sealing said extremities to said sleeve means, support means flexibly connecting said first and second pipes, said sleeve means comprising first and second, semicircular, rigid sleeve members, and bolt means securing said sleeve members together, said means in said coupler sleeve means for flexibly sealing said extremities to said sleeve means comprising a generally cylindrically shaped sealing boot having opposite ends sealably embracing said first and second pipes, said boot having a first annular groove formed in the exterior surface thereof adjacent one end thereof and a second annular groove formed in its exterior surface adjacent the other end thereof, each of said sleeve members having first and second inwardly extending ridges at each end thereof, said second ridge being received by said first and second annular grooves, said first ridge being positioned outwardly of the opposite ends of said boot.

3. The pipe joint of claim 2 wherein said boot has a cylindrical body portion positioned between said annular grooves, said boot having first and second annular end portions outwardly of said grooves, respectively, said end portions having a wall thickness greater than the wall thickness of said body portion.

4. The pipe joint of claim 3 wherein first and second flexible, inclined, annular flap members extend inwardly from said first and second end portions respectively which sealably embrace the said first and second pipes respectively.

5. The pipe joint of claim 4 wherein said flap members have an inner diameter which is less than the outside diameter of said pipes so that said flap members will sealably embrace said pipes.

6. The pipe joint of claim 5 wherein said first annular groove and said cylindrical body portion define a first shoulder annular portion therebetween, said second annular groove and said cylindrical body portion defining a second annular shoulder portion therebetween, said shoulder portions having a wall thickness substantially equal to the wall thickness of said body portion.

7. A pipe joint for flexibly joining an extremity of a first pipe to an extremity of a second pipe positioned in axial alignment with and spaced from the first pipe, comprising a generally cylindrical coupler sleeve means surrounding the adjacent extremities of said first and second pipes, means in said coupler sleeve means for flexibly sealing said extremities to said sleeve means, support means flexibly connecting said first and second pipes, said sleeve means comprising first and second, semicircular, rigid sleeve members, and bolt means securing said sleeve members together, said means in said coupler sleeve means for flexibly sealing said extremities to said sleeve means comprising a generally cylindrically shaped sealing boot having opposite ends sealably embracing said first and second pipes, said support means comprising a universal joint means, said universal joint means comprising first and second support members secured at opposite sides of and adjacent the extremity of said first pipe, third and fourth support members secured at opposite sides of and adjacent the extremity of said second pipe, a ring means extending around said sleeve means in a radially spaced relationship with respect thereto, elongated pivot arms respectively secured at one end to said first, second, third and fourth support members and being respectively pivotally connected at their other ends to said ring means, the pivot connections being alternately and circumferentially spaced on said ring means at 90° from each other.

8. The pipe joint of claim 7 wherein a control means interconnects said first and second pipes to provide an actuating signal in consequence of the angular relations assumed by said pipes.

9. A pipe joint for flexibly joining an extremity of a first pipe to an extremity of a second pipe positioned in axial alignment with and spaced from the first pipe, comprising a generally cylindrical coupler sleeve means surrounding the adjacent extremities of said first and second pipes, means in said coupler sleeve means for flexibly sealing said extremities to said sleeve means, support means flexibly connecting said first and second pipes, said sleeve means comprising first and second, semicircular, rigid sleeve members, said means in said coupler sleeve means for flexibly sealing said extremities to said sleeve means comprising a generally cylindrically shaped sealing boot having opposite ends sealably embracing said first and second pipes, said support means comprising a universal joint means, said universal joint means comprising first and second elongated pivot arms operatively secured at one end thereof to opposite sides of and adjacent the extremity of said first pipe, third and fourth elongated pivot arms operatively secured at one end thereof to opposite sides of and adjacent the extremity of said second pipe, a ring means extending around said sleeve means in a radially spaced relationship with respect thereto, said first, second, third, and fourth pivot arms being pivotally connected at their other ends to said ring means, the pivotal connections being alternately and circumferentially spaced on said ring means at 90° from each other.

10. A pipe joint for flexibly joining an extremity of a first pipe to an extremity of a second pipe positioned in axial alignment with and spaced from the first pipe, comprising a mechanical universal joint means secured to and pivotally connecting said first and second pipes for permitting relative angular movement between said first and second pipes, a generally cylindrical coupler sleeve means surrounding the adjacent extremities of said first and second pipes, means in said coupler sleeve means for flexibly sealing said extremities to said sleeve means, said universal joint means being spaced from said coupler sleeve means and being free from engagement therewith, said sleeve means comprising first and second, semicircular, rigid sleeve members, said means in said coupler sleeve means for flexibly sealing said extremities to said sleeve means comprising a generally cylindrically shaped sealing boot having opposite ends sealably embracing said first and second pipes, and means for detachably securing said first and second semicircular sleeve members together to form said coupler sleeve means whereby said sleeve means may be disassembled to replace the sealing boot therein without disconnecting said universal joint means.

11. In a pipe joint for flexibly joining the well spaced extremities of two generally aligned pipes for use in a center pivot irrigation system, a pair of generally aligned pipes with their opposed extremities well spaced from each other a mechanical interconnect for flexibly connecting and maintaining the pipe ends in well spaced relation, a generally cylindrical coupler sleeve made up of two semicircular half shells bolted together along their abutting longitudinal edges, each half shell having an inwardly extending ridge at each end of limited axial extent and terminating in radial spaced relation to the pipes so as to be out of metal-to-metal contact therewith to provide flexing of the pipes relative thereto within the coupler sleeve, and a generally cylindrical sealing boot disposed inside the coupler sleeve around the pipe extremities and made of a material having the general characteristics of rubber as to flexibility and distortability, the boot being continuous and impervious from end to end and having annular portions at each end formed on the inside to a diameter to seal agaist the exterior of the pipe extremities, and a more flexible cylinder with a larger inside diameter than the inside of the end portions, the cylinder being integral with and bridging the end portions with its inside providing substantial radial clearance with the pipe extremities so that the adjacent pipes may deflect a substantial amount from axial alignment relative thereto and the degree of axial overlap of the sealing boot on each pipe being so related to the spacing between the pipe extremities that the sealing boot may be removed from between the pipe ends, after the coupler sleeve has been removed, allowing replacements to be made without disturbing the position of the pipes.

12. The structure of claim 11 further characterized in that the annular portions at each end of the boot are substantially thicker radially than the flexible cylinder.

13. The structure of claim 11 further characterized by and including an interlock between the exterior of each of the annular portions and the shells to hold the boot in place in the shells.

14. The structure of claim 13 further characterized in that the interlocks include an inwardly projecting rib in the shells fitted in an annular groove in the exterior of the boot.

* * * * *